United States Patent
Mehrvar et al.

(10) Patent No.: US 10,205,534 B2
(45) Date of Patent: Feb. 12, 2019

(54) SYSTEMS AND METHODS FOR NETWORK SIGNALING

(71) Applicants: Hamid Mehrvar, Ottawa (CA); Mohammad Mehdi Mansouri Rad, Kanata (CA)

(72) Inventors: Hamid Mehrvar, Ottawa (CA); Mohammad Mehdi Mansouri Rad, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/402,914

(22) Filed: Jan. 10, 2017

(65) Prior Publication Data
US 2018/0198547 A1   Jul. 12, 2018

(51) Int. Cl.
*H04B 10/61* (2013.01)
*H04B 10/40* (2013.01)
*H04B 10/516* (2013.01)
*H04B 10/25* (2013.01)

(52) U.S. Cl.
CPC ............ *H04B 10/616* (2013.01); *H04B 10/25* (2013.01); *H04B 10/40* (2013.01); *H04B 10/516* (2013.01)

(58) Field of Classification Search
CPC .......... H04B 10/077–10/0779; H04B 2210/07; H04B 2210/075; H04B 2210/078
See application file for complete search history.

(56) References Cited

U.S. PATENT DOCUMENTS

2005/0286890 A1* 12/2005 Carrick .............. H04B 10/0775
398/32
2008/0145063 A1* 6/2008 Li ........................ H04B 10/40
398/140
2011/0206383 A1   8/2011 Chien et al.
2013/0011142 A1* 1/2013 Goodson ............ H04Q 11/0067
398/98
2014/0010543 A1* 1/2014 Lee ........................ H04B 10/61
398/79

FOREIGN PATENT DOCUMENTS

| CN | 103281135 A | 9/2013 |
|---|---|---|
| CN | 103475416 A | 12/2013 |
| CN | 105933071 A | 9/2016 |
| WO | 2008033722 A2 | 3/2008 |
| WO | 2015154806 A1 | 10/2015 |

OTHER PUBLICATIONS

International Search Report dated Apr. 3, 2018 for corresponding International Application No. PCT/CN2017/120209 filed Jan. 10, 2017.

* cited by examiner

*Primary Examiner* — Casey Kretzer

(57) ABSTRACT

A method for conveying information through an optical fiber link between a transmitter and a receiver of an optical communication system. The method includes generating, by the transmitter, a predetermined spectral change, and inserting the predetermined spectral change into an optical fiber link for transmission to the receiver. A detector associated with the receiver detects the predetermined spectral change in an optical signal received through the optical fiber link, and generates a detection signal in accordance with the detection result. The detector is independent of a digital signal processor of the receiver that is configured to recover data modulated on the optical signal received through the optical fiber link.

19 Claims, 8 Drawing Sheets

SYSTEMS AND METHODS FOR NETWORK SIGNALING

FIELD OF THE INVENTION

The present invention pertains to the field of optical communication networks, and in particular to systems and methods for network signalling.

BACKGROUND

In an optical transport network (OTN), data are commonly transmitted from a transmitter to a receiver by modulating an optical carrier light with digital information to generate an optical signal, which is then transmitted through an optical link to a receiver. At the receiver, the optical signal impinges on photodetectors, which generate photocurrent. The photocurrent is then processed to recover the data. In a coherent receiver, this processing typically uses a Digital signal processor (DSP) cascaded with a Forward Error Correction (FEC) decoder block. The DSP typically performs Analog-to-Digital Conversion (ADC), chromatic dispersion (CD) compensation, symbol clock recovery, polarization demultiplexing and Polarization Mode Dispersion (PMD) compensation, Frequency Offset Compensation, carrier phase recovery and finally symbol detection. The FEC block processes the detected symbols to recover the transmitted data.

In practical OTN systems, the data includes subscriber data and overhead data. The overhead data includes Operations Administration and Management (OAM) signaling that is used to control the optical link between the transmitter and receiver. Typically, the OAM signalling is included as a tributary data stream with the subscriber data modulated on the optical signal.

A limitation of this arrangement is that the DSP and FEC block must be fully operational at all times, even when there is little or no information is transmitted, causing a significant increase in power consumption.

This background information is provided to reveal information believed by the applicant to be of possible relevance to the present invention. No admission is necessarily intended, nor should be construed, that any of the preceding information constitutes prior art against the present invention.

SUMMARY

An object of the present disclosure is to provide an improved system and method for conveying information from a transmitter to a coherent optical receiver. In accordance with the present disclosure, at least initial signaling information may be transmitted in a manner that does not require the DSP and FEC block of the coherent optical receiver to be fully operational.

In accordance with embodiments of the present invention, there is provided a method for conveying information through an optical fiber link between a transmitter and a receiver of an optical communication system. The method includes generating, by the transmitter, a predetermined spectral change in an optical signal, and transmitting the optical signal including the predetermined spectral change through an optical fiber link to the receiver. The predetermined spectral change is indicative of the signaling information. The predetermined spectral change in the optical signal is detected by a detector associated with the receiver, and a detection signal is generated in accordance with the detection result. The detector may be made independent of a receiver digital signal processor configured to demodulate data modulated on the optical signal.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
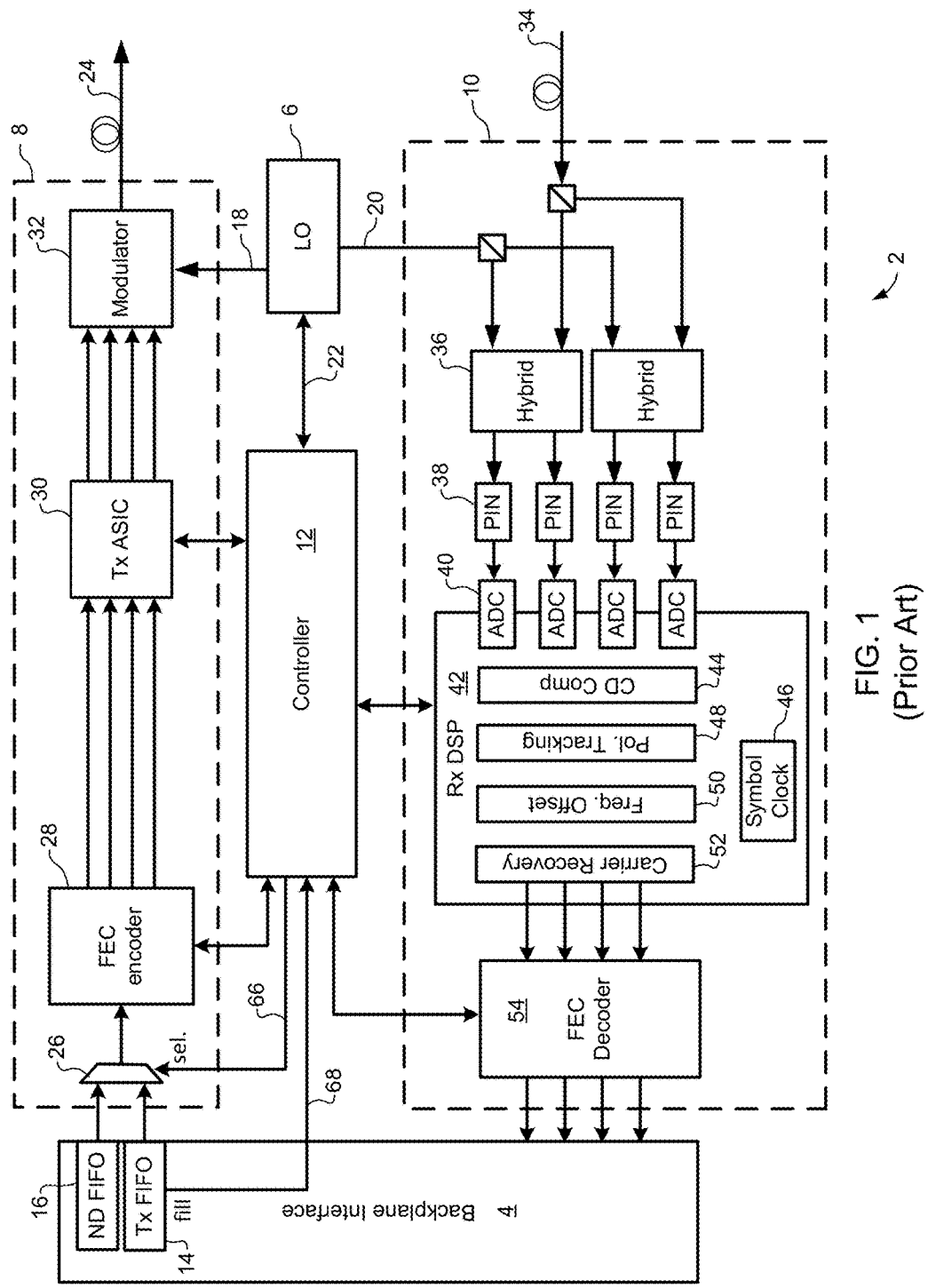
FIG. 1 is a block diagram schematically illustrating principle elements of a coherent optical transceiver.

FIG. 1 is a block diagram schematically illustrating principle elements of a coherent optical transceiver. As may be seen in FIG. 1, the transceiver 2 generally includes a backplane interface 4, a local oscillator (LO) 6, a transmitter 8, a receiver 10, and a controller 12.

The backplane interface 4 provides a communication path between the transceiver 2 and a communications backplane (not shown) of a network node. Typically, the backplane interface 4 includes a transmit First-In-First-Out (Tx FIFO) buffer 14 for buffering subscriber data traffic for processing and transmission by the transmitter 8. The backplane interface 4 may also include a null data First-In-First-Out (ND FIFO) buffer 16 configured to supply the transmitter with null data (such as, for example, a random or pseudo-random bit sequence) as will be described in greater detail below.

The local oscillator 6 is configured to provide respective transmitter (Tx) and receiver (Rx) local oscillator lights 18, 20 to the transmitter 8 and the receiver 10 in a manner known in the art. Typically, the Tx and Rx local oscillator lights 18, 20 have a common frequency, but this is not essential. The local oscillator 6 may be a tunable laser, in which case one or more control signals 22 from the controller 12 may be used adjust the frequency of the Tx and Rx local oscillator lights 18, 20. For example, frequency of the Tx and Rx local oscillator lights 18, 20 may be adjusted to match (or maintain a given offset from) a carrier frequency of an inbound optical signal received by the receiver 10.

The transmitter 8 operates in a known manner to process data traffic to generate a corresponding modulated optical signal 24 for transmission through an optical fiber link. Typically, the transmitter 8 includes an n:1 switch 26 for selectively connecting either the Tx FIFO 14 or the ND FIFO 16 to the transmitter 8. Data read out from the selected FIFO 14 or 16 is processed by a Forward Error Correction (FEC) encoder 28 to generate FEC encoded data frames, which are supplied to a Transmitter Application Specific Integrated Circuit (Tx ASIC) 30 configured to generate drive signals for modulating the Tx Local Oscillator light 18 to generate the modulated optical signal 24. The drive signals generated by the Tx ASIC 30 are supplied to an optical modulator 32 which operates in in a known manner to modulate the Tx Local Oscillator light 18 to generate the modulated optical signal 24. The Tx ASIC 30 may be a driver circuit which is configured to generate analog drive signals to modulate the Tx Local Oscillator light in accordance with a selected modulation scheme such as Quadrature Phase Shift Keying (QPSK), for example. In some embodiments, the Tx ASIC 30 may perform additional operations such as, for example, Chromatic Dispersion pre-compensation, and non-linear compensation. The modulator 32 may be configured as a nested Mach-Zehnder modulator, but other configurations are also possible.

The transmitter 8 illustrated in FIG. 1 is particularly configured to generate the modulated optical signal 24 having a pair of orthogonal polarizations linear polarization state. If desired, the transmitter 8 may be configured, in accordance with methods known in the art, to generate the modulated optical signal 24 having a linear polarization state.

The receiver 10 operates in a known manner to receive and process an in-bound optical signal 34 received through the optical fiber link to recover the data transmitted by the transmitter stage of a corresponding transceiver at the opposite end of the optical fiber link. Typically, the receiver 10 includes an optical hybrid 36 configured to receive the inbound optical signal 34 and combine it with the Rx Local Oscillator light 20. The combined signals output from the optical hybrid 36 are made incident on respective photodetectors 38 to generate corresponding electrical photodetector signals. These photodetector signals are then sampled by Analog-to-Digital Converters (ADCs) 40 to generate corresponding digital input signals, which are processed by a Receiver Digital Signal Processor (Rx DSP) 42 for recovering the data modulated on the in-bound optical signal 34. The Rx DSP 42 may perform operations of Chromatic Dispersion (CD) compensation 44; Symbol clock recovery 46; Polarization tracking and compensation 48; Frequency Offset compensation 50; and Carrier phase recovery and symbol detection 52. Each of these operations may be performed in a manner known in the art, and so will not be described in greater detail herein. Recovered bits (or symbols) are supplied by the Rx DSP 42 to a FEC decoder 54, which operates in a known manner to correct bit and symbol errors in the data symbols detected by the Rx DSP 42, and thereby recover the original data modulated by the transmitter from the received optical signal 34. The recovered data may then be received by the transceiver 2 via the backplane interface 4.

For the purposes of the present disclosure the term "data channel" shall be understood to refer to a predetermined spectral band of the optical communications system that is allocated for carrying optical signals modulated with subscriber data traffic.

The controller 12 operates to control operations of the transceiver 2. Example operations that the controller 12 may perform include (but are not limited to) any one or more of: controlling the frequency of the Tx and Rx local oscillator lights 18, 20; calculation of compensation coefficients for the Rx CD compensation 44 and polarization tracking 48 functions; and selection of FEC scheme implemented in the FEC encoder 28 and decoder 54. In order to perform these operations, the controller 12 may need to exchange information with its counterpart transceiver at the opposite end of the optical fiber link. Typically, this information exchange is accomplished via Operations Administration and Management (OAM) signalling which is usually modulated onto the outbound optical signal along with the data traffic. For example, the OAM signalling may be accorded a time-slot in the data stream read from the Tx FIFO 14, and thereby multiplexed into the data stream being processed through the FEC encoder 28 and Tx ASIC 30 for modulation onto the Tx Local Oscillator light 18.

Figure 2:
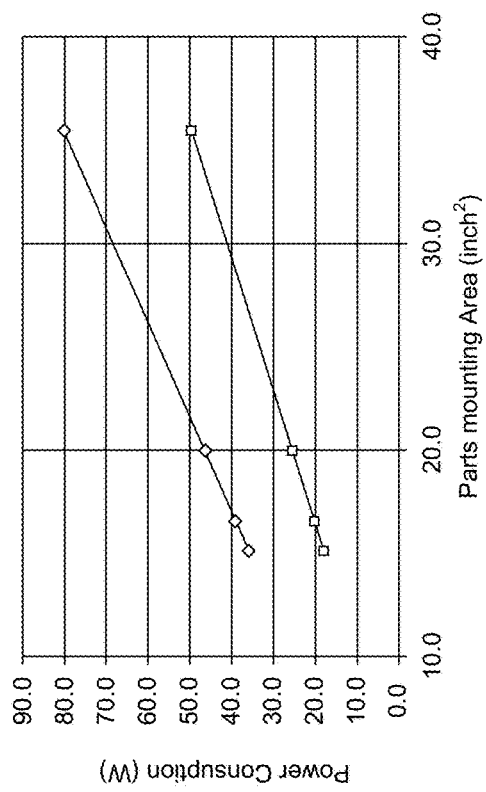
FIG. 2 is a chart illustrating representative power consumption values of example coherent optical transceivers.

FIG. 2 is a chart illustrating representative power consumption values vs. parts mounting area for a coherent optical transceiver. This chart is based on a study published by NTT Electronics Corp., in 2013 (See: Srivastra, Atul: Optical Integration and the Role of DSP in Coherent Optics Modules, NTT Electronics Corp, 2013). This study shows that in a typical coherent optical transceiver, the Rx DSP 42 and FEC decoder 54, taken together, consume approximately 50% of the total power consumed by the transceiver. Interestingly, this high proportion of power consumption is maintained across a wide range of different sizes of transceivers.

Figure 3:
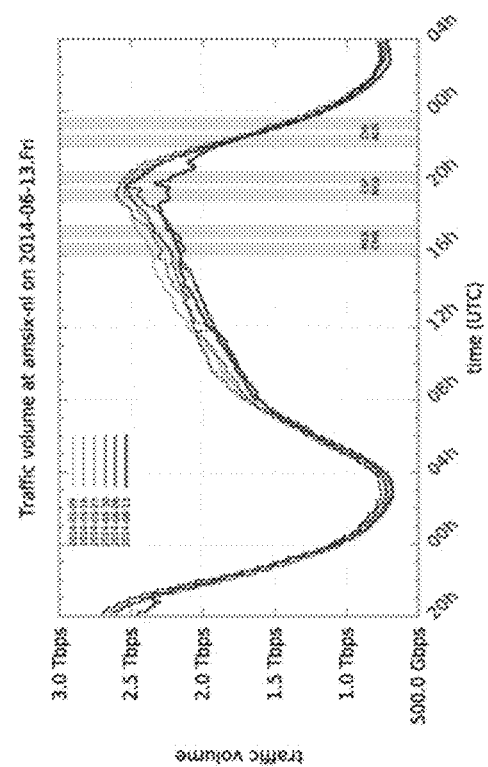
FIG. 3 is a chart illustrating representative subscriber traffic volume through an example node of the Optical Transport Network (OTN) as a function of time.

FIG. 3 is a chart illustrating representative subscriber traffic volume through a particular node of the Optical Transport Network (OTN) as a function of time. The specific chart shown in FIG. 3 is for node "AMS-IX", located in Amsterdam, Netherlands, for the dates 8 May 2014, 16 May 2014, 23 May 2014, 30 May 2014, 6 Jun. 2014 and 13 Jun. 2014. As may be seen in FIG. 3, over a 24-hour period, the node "AMS-IX" experienced subscriber traffic volume which varied between about 750 Gbps and 2.7 Tbps. Those of ordinary skill in the art will recognise that other nodes in the OTN show closely similar fluctuations in subscriber data traffic volume. Since a typical transceiver in the OTN has a capacity of 100 Gbps, the observed variation in traffic volume means that there are significant periods of time during which transceivers are idle, in the sense that they are not carrying any subscriber data traffic.

However, even while an idle transceiver is not transmitting subscriber data traffic it must continue to operate in order to maintain its Symbol clock recovery 46, Polarization tracking and compensation 48, Frequency Offset compensation 50 and Carrier phase recovery 52 functions, as well as to maintain the OAM signalling channel with its counterpart transceiver at the other end of the optical fiber link. Accordingly, idle transceivers are usually provided with a "null data stream" which may be composed of a random or pseudo-random bit stream. This null data may be supplied to the transceiver through a respective ND FIFO 16, via the n:1 switch 26. By this means, the controller 12 can use a select signal 66 as needed to selectively insert null data into the data stream processed through the transmitter 8 in order to fill any portion of the capacity of the transceiver that is not occupied by subscriber data (and OAM signalling). For example, the controller 12 may use a fifo-fill signal 68 generated by the Tx FIFO 14 as an indication of whether or not there is subscriber data (and OAM signalling) to be transmitted. For example, when the fifo-fill signal 68 indicates that the Tx FIFO 14 is empty, the controller 12 may determine that there is no subscriber data (and OAM signalling) to be transmitted, and respond by using the select signal 66 to connect the ND FIFO 16 to the transmitter 8 so that the transmitter 8 will continue to transmit the optical signal 24 modulated with null data.

This arrangement is beneficial in that it ensures that the transceiver is maintained in an operating condition at all times, and can properly process and transmit subscriber data and OAM signalling as needed. However, there is also a problem, in that all of the transceivers in the OTN must necessarily be operating, and so be drawing full power at all times, even when they are idle. It would be preferable to shut down at least the Rx DSP 42 and the FEC decoder 54 of idle transceivers, in order to significantly reduce power consumption.

Figure 4:
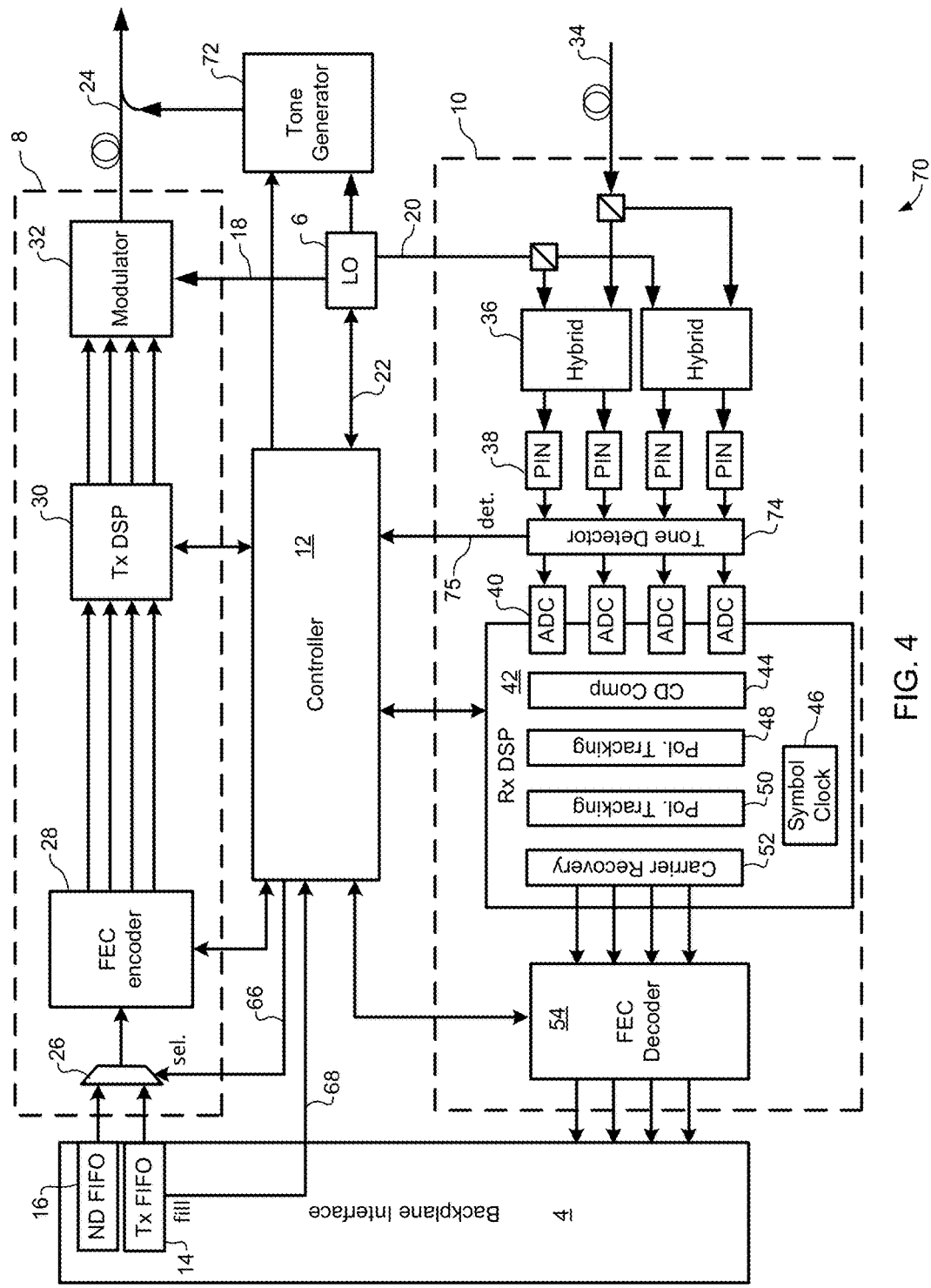
FIG. 4 is a block diagram schematically illustrating principle elements of a coherent optical transceiver in accordance with a representative embodiment of the present invention.

FIG. 4 is a block diagram schematically illustrating principle elements of a coherent optical transceiver 70 in which this problem is addressed by providing a means by which the transceivers at each end of an optical fiber link can exchange at least signalling information by way of predetermined spectral changes that can be detected independently of an operational state of the Rx DSP 42 and FEC decoder block 54. In examples described below with reference to FIGS. 4-10, the predetermined spectral changes may include one or more optical tones. However, the present technique is not limited to the use of tone signals. Rather, it will be understood that any spectral change that can be unambiguously detected at the receiving end of the optical fiber link without demodulation of the optical signal by the Rx DSP may be used without departing from the intended scope of the claims. For example, the predetermined spectral changes may comprise any suitable predetermined pattern of optical power variation as a function of any combination of frequency, time or polarization.

The signaling information may be indicative of an operation state of the sending transceiver and/or the optical fiber link. For example, the signalling information may indicate an "idle" or "active" state of the sending transceiver, as will be described in greater detail below. Alternatively, the signalling information may indicate a degree of utilization (or an available capacity) of the optical fiber link.

As may be seen in FIG. 4, the illustrated example transceiver 70 generally comprises the backplane interface 4, the local oscillator 6, the transmitter 8, the receiver 10, and a controller 12, all of which may operate in a manner described above with reference to FIG. 1. The transceiver 70 of FIG. 4 differs from the transceiver 2 of FIG. 1 in that it also includes a tone generator 72 associated with the transmitter 8, and a tone detector 74 associated with the receiver 10.

In general terms, the tone generator 72 operates to insert one or more optical tones into the outbound optical signal 24 generated by the transmitter 8. Conversely, the tone detector 74 operates to detect one or more optical tones in an inbound optical signal 34, and generates a detection signal 75 in accordance with the detection result. When corresponding transceivers are provisioned at opposite ends of an optical fiber link, the tone generator 72 and tone detector 74 can cooperate to exchange signalling information between the two transceivers that is not dependent on the on the Rx DSP 42 and FEC decoder block 54 of the receiving transceiver.

Figures 5A, 5B:
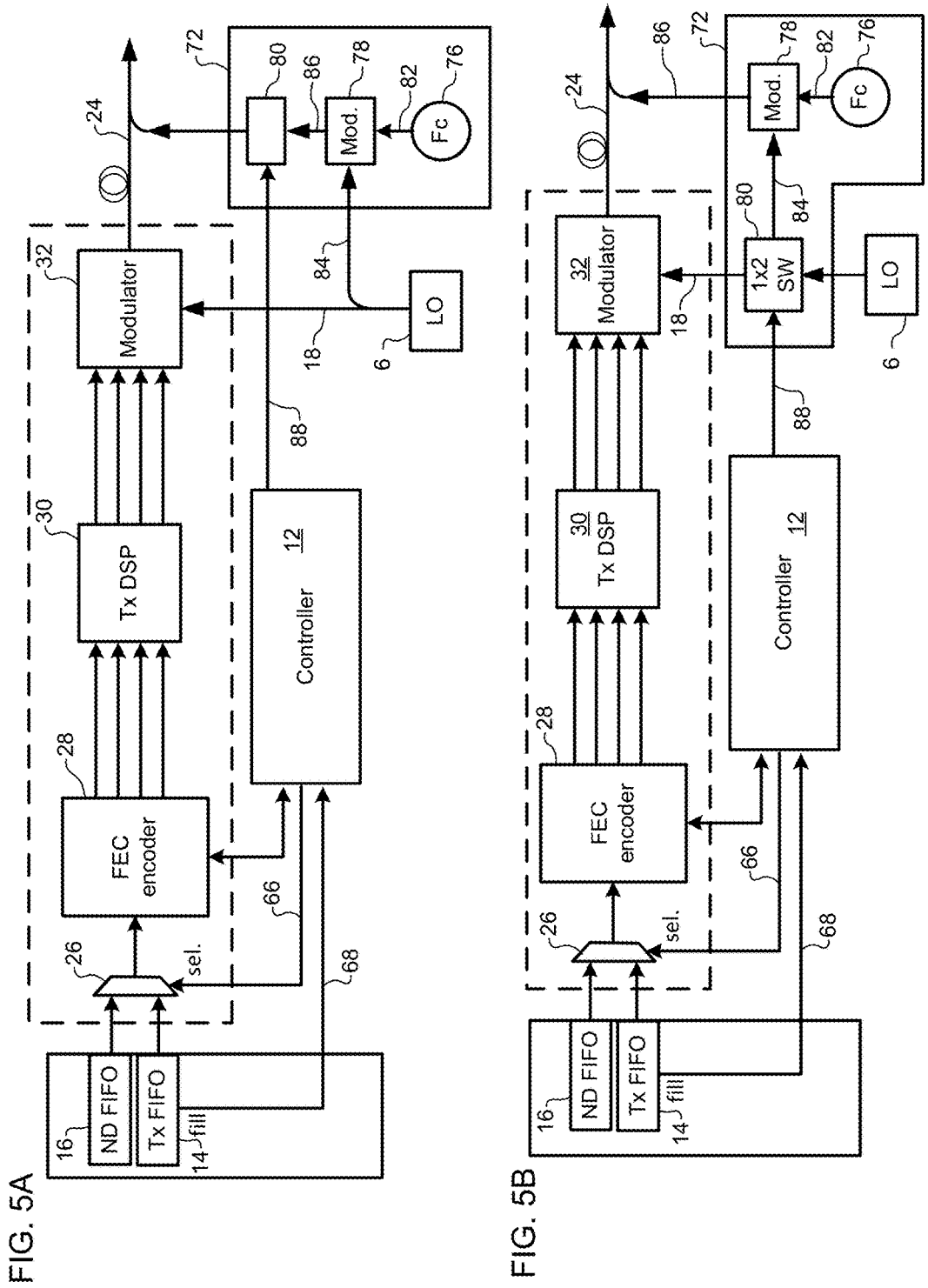
FIGS. 5A and 5B are block diagrams schematically illustrating respective alternative tone generators usable in the optical transceiver of FIG. 4.

FIG. 5A is a block diagram schematically illustrating an example tone generator 72. In the illustrated example, the tone generator 72 comprises an oscillator 76, a modulator 78, and a shutter 80. If desired, the tone generator 72 may also include one or more filters along with monitoring and signal processing functions known in the art. For simplicity of illustration and explanation, such filters and monitoring and signal processing functions are not shown in the drawings. The oscillator 76 may be configured to generate one or more electrical oscillator signals 82 at desired frequencies. For example, the oscillator 76 may generate a single electrical oscillator signal 82 having a selected frequency $f_c$. The modulator 78 may operate to modulate the oscillator signal(s) 82 onto a tone carrier light 84 to generate the desired optical tone signal 86. The shutter 80 is controlled by the controller 12 via a suitable control signal 88, and may be configured to control the admission of the optical tone signal 86 to the optical fiber link. Thus, for example, when the shutter 80 is "open", the optical tone signal 86 may be admitted to the optical fiber link and so may be conveyed to the counterpart transceiver at the other end of the link. Alternatively, when the shutter 80 is "closed", the optical tone signal 86 may be blocked from the optical fiber link. By this means, the controller 12 can control when the optical tone signal 86 is admitted to the optical fiver link, and so may use the optical tone signal 86 to convey information to the counterpart transceiver at the other end of the link. This operation may be more clearly understood by reference to FIGS. 6A-6C.

Figure 6A:
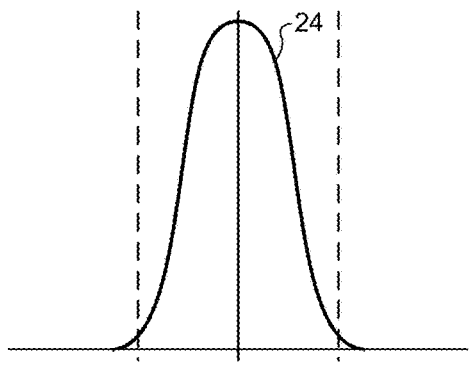
FIGS. 6A-6C are charts schematically illustrating operation of a first example tone generator usable in the optical transceiver of FIG. 4.
Figure 7A:
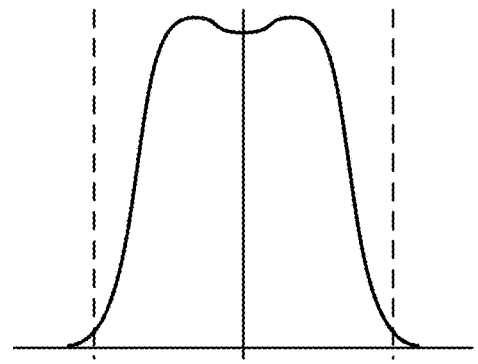
FIGS. 7A-7C are charts schematically illustrating operation of a second example tone generator usable in the optical transceiver of FIG. 4.
Figure 6B:
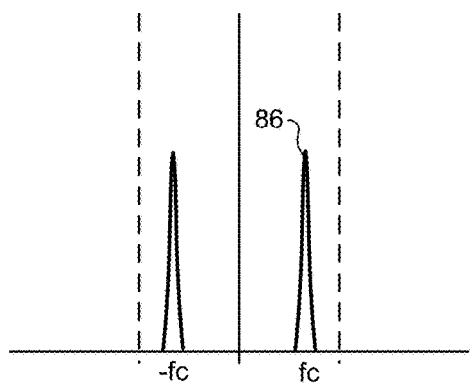
Figure 7B:
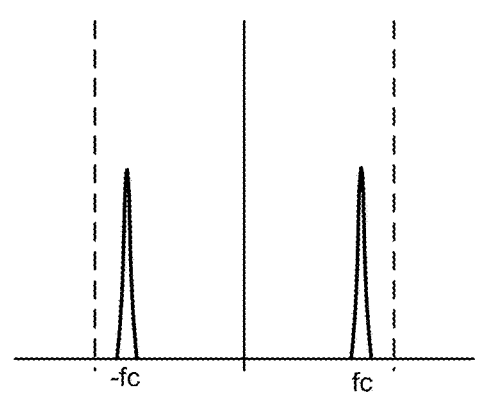
Figure 6C:
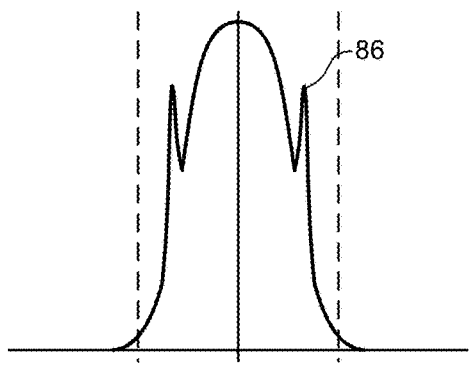
Figure 7C:
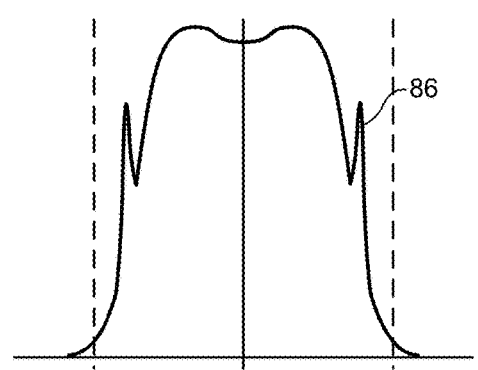

FIG. 6A is a chart schematically illustrating a spectrum of the modulated optical signal 24 output from the transmitter 8. The spectrum of FIG. 6A is typical of optical signals modulated on a single optical carrier light 18, for example signals conforming to the International Telecommunications Union (ITU) standards for 50 GHz optical signals. FIG. 6B is a chart schematically illustrating a spectrum of the optical tone signal 86 generated using the tone generator 72 of FIG. 5A. As may be seen in FIG. 6B, the spectrum includes a pair of narrow-band spikes centered on $\pm f_c$. When the shutter 80 is "closed", the optical tone signal 86 is blocked from the optical fiber link, so that the optical signal transmitted through the optical fiber link is composed of only the modulated optical signal 24 output from the transmitter 8, and so has a spectrum of the form shown in FIG. 6A. On the other hand, when the shutter 80 is "open", the optical tone signal 86 is admitted to the optical fiber link. Consequently, the optical signal transmitted through the optical fiber link is the combination of the modulated optical signal 24 output from the transmitter 8 and the optical tone signal 86, and so has a spectrum of the form shown in FIG. 6C. FIGS. 7A-7C correspond with FIGS. 6A-6C, for the case of optical signals modulated on a dual optical carrier light 18, for example signals conforming to the International Telecommunications Union (ITU) standards for 100 GHz optical signals.

As noted above, the oscillator 76 is configured to generate one or more electrical oscillator signals 82 at desired frequencies. Any suitable electrical oscillator or combination of oscillators may be used for this purpose, such as, for example, a crystal oscillator or voltage controlled oscillator of a type well known in the art.

In the embodiments illustrated in FIGS. 5A and 5B, the tone carrier light 84 is obtained from the Tx local oscillator light 16, but this is not essential. If desired, a separate light source could be used to generate the tone carrier light 84. For example, a tunable laser, or a light emitting diode in combination with a suitable optical filter may be used, if desired.

The optical modulator 78 may be provided as a variable optical attenuator (VOA) configured to amplitude modulate the tone carrier light 84 in accordance with the oscillator signal(s) 82.

The shutter 80 may also be provided as any of a variable optical attenuator (VOA), a wavelength blocker or a waveband blocker, which may be driven by the control signal 88 between an open state in which the optical tone signal 86 can pass through the shutter with minimal attenuation, and a closed state in which the optical tone signal 86 is effectively extinguished.

The shutter 80 may be implemented by other means, if desired. For example, FIG. 5B illustrates an embodiment in which the shutter 80 is implemented by a 1×2 optical switch located between the LO 6 and the modulator 78. In this case, when the shutter 80 is "closed", light from the LO 6 is passed through the 1×2 optical switch to the transmitter modulator 32 as the Tx Local Oscillator light 18, so that the optical signal transmitted through the optical fiber link is composed of only the modulated optical signal 24 output from the transmitter 8, and so has a spectrum of the form shown in FIGS. 6A and 7A. On the other hand, when the shutter 80 is "open", light from the LO 6 is passed through the 1×2 optical switch to the tone generator modulator 78, so that the optical signal transmitted through the optical fiber link is composed of only the optical tone signal 86, and so has a spectrum of the form shown in FIGS. 6B and 7B.

As noted above, in the embodiment of FIG. 5A the optical tone signal 86 may be transmitted simultaneously with the modulated optical signal 24 output from the transmitter 8. On the other hand, the embodiment of FIG. 5B operates to transmit either the optical tone signal 86 or the modulated optical signal 24 output from the transmitter 8, but not both at the same time. In both of these embodiments, it will be appreciated that transmission of the optical tone signal 86 will interfere with the modulated optical signal 24, and so will tend to produce errors in data recovered by the receiver in the counterpart transceiver at the other end of the link. However, this problem can be avoided by timing the transmission of the optical tone signal 86 to coincide with periods during which the transmitter 8 is processing and transmitting null data. For example, in some embodiments the controller 12 may control the shutter 80 to admit the optical tone signal 86 only when the select signal 66 is set to connect the ND FIFO 16 to the transmitter 8. For example, in some embodiments, the shutter control signal 88 may be linked to or derived from the select signal 66.

It will be appreciated that the tone generator 72 illustrated in FIGS. 4 and 5A-5B is configured to insert a single tone signal 86 into the modulated optical signal 24. In some embodiments, the tone generator 72 may generate a linearly polarized tone signal 86, which may be inserted into the optical signal 24 with a selected orientation relative to the polarization state of the optical signal 24. For example, the linearly polarized tone signal 86 may be aligned with one of the X- and Y-polarization axes of the optical signal 24, or at a selected angle (such as 45°, for example) with respect to the X- and Y-polarization axes of the optical signal 24. Alternatively, those of ordinary skill in the art will recognise that the tone generator 72 can be readily modified to generate tone signals 86 on respective orthogonal polarization axes, if desired.

Figure 8:
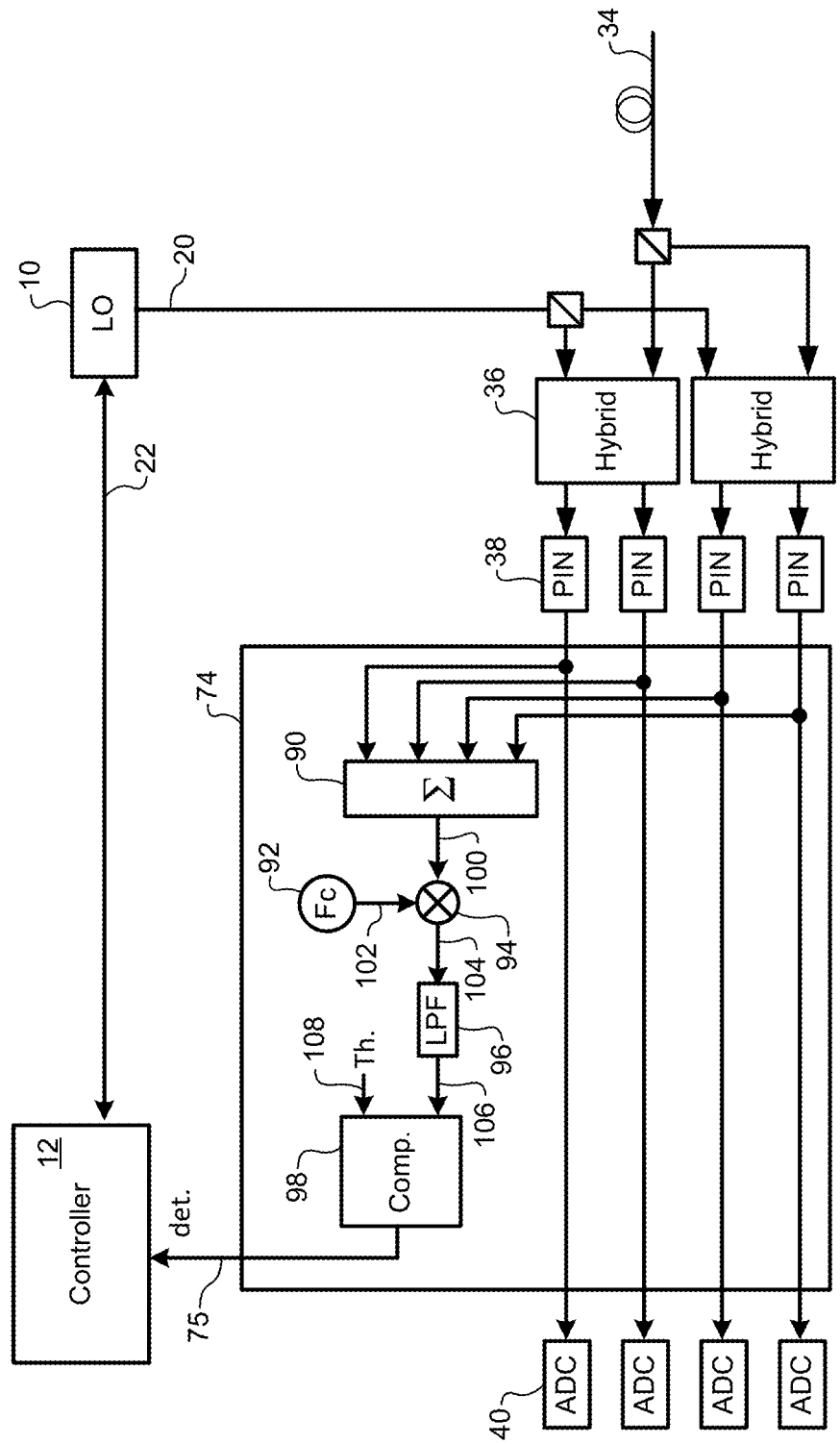
FIG. 8 is a block diagram schematically illustrating principle elements of an example tone detector usable in the optical transceiver of FIG. 4.

FIG. 8 is a block diagram schematically illustrating an example tone detector 74. In the illustrated example, the tone detector 74 implements a heterodyne (or homodyne) receiver and a threshold detector to detect tone signals at one or more predetermined frequencies. For simplicity of description, the tone detector 74 is configured to detect a single tone signal in the received optical signal 34. However, it will be appreciated that the tone detector 74 may be configured to detect two or more tone signals at respective different frequencies in the received optical signal 34.

As may be seen in FIG. 8, the example tone detector 74 comprises a summation block 90, an oscillator 92, a mixer 94, a filter 96, and a threshold comparator 98.

The photodetector signals generated by the photodetectors 38 are tapped and supplied to the input of the summation block 90, which performs an analog summation operation to generate a corresponding summed signal 102. This summation operation is advantageous in that the resulting summed signal 102 is less dependent on the state of polarization of the received optical signal 34, as compared to any one of the tapped photodetector signals. Well known analog voltage adder techniques may be used to implement the summation block 90. For example, the summation block 90 may be implemented using a set of parallel resistors, if desired.

The oscillator 92 is configured to generate one or more electrical oscillator signals 100 at desired frequencies. For example, the oscillator 92 may generate a single electrical oscillator signal 100 having a selected frequency $f_c$. In some embodiments, the frequency of the electrical oscillator signal 100 corresponds with the frequency of the oscillator signal 82 of the tone generator, but this is not essential. The oscillator 92 may be implemented using known electrical oscillator techniques including, for example, crystal oscillators and voltage controlled oscillators. Similarly, the oscillator signal(s) 102 may be digital or analog signals, as desired.

The mixer 94 may be implemented using suitable analog electrical radio frequency mixer techniques known in the art, and is configured to mix the summed signal 100 with the oscillator signal(s) 102 to generate a combined signal 104. The combined signal 104 generated by the mixer 94 may then be filtered (at 96) to suppress out-of-band signals, and thereby emphasize the tone signals.

The filter 96 may be implemented using suitable analog electrical low-pass or band-pass filtering techniques well known in the art. Preferably, the pass band width of the filter 96 is selected based on the expected width of the tone signal 86 (FIGS. 5A and 5B) embedded in the received optical signal 34. In the illustrated embodiment, the filter 96 is implemented as a low-pass filter. This example is suitable for embodiments in which heterodyne detection is used to detect a single optical tone embedded within the optical signal 34. In embodiments in which homodyne detection is used, or in which two or more tone signals 86 are to be detected, band-pass filtering may be used.

Figure 9A:
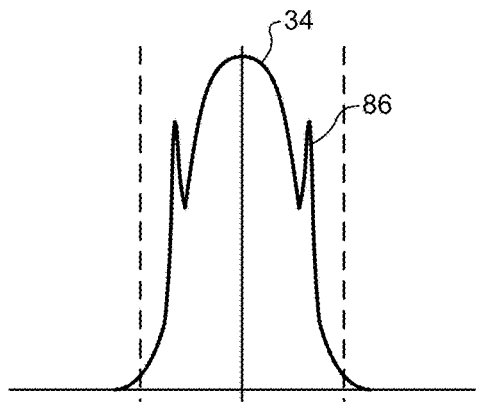
FIGS. 9A-9C are charts schematically illustrating operation of a first example tone detector usable in the optical transceiver of FIG. 4.
Figure 10A:
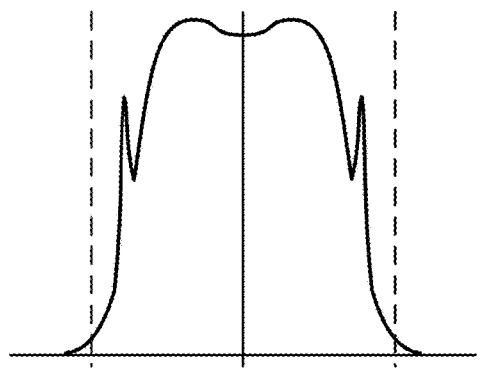
FIGS. 10A-10C are charts schematically illustrating operation of a second example tone detector usable in the optical transceiver of FIG. 4.
Figure 9B:
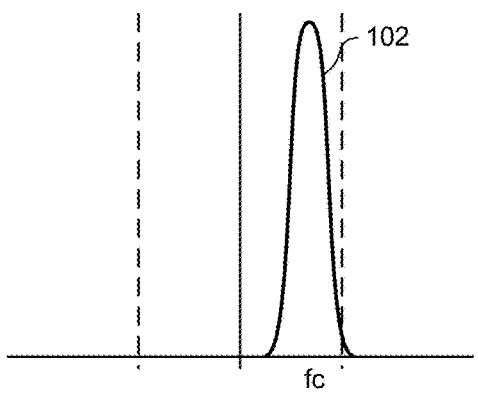
Figure 10B:
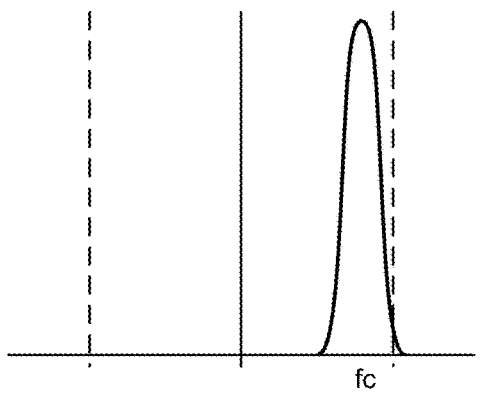
Figure 9C:
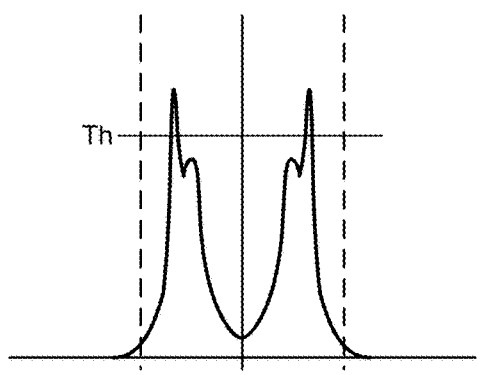
Figure 10C:
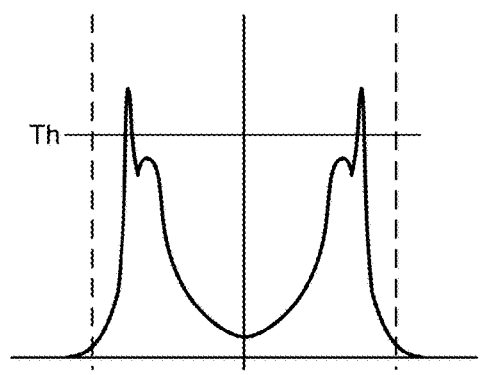

FIGS. 9 and 10 illustrate operation of the mixer 94 and filter 96 in greater detail. In particular, FIG. 9A illustrates a representative spectrum of the received optical signal 34 (and thus the summed signal at the output of the summation block 90) which includes an embedded tone signal 86. FIG. 9B schematically illustrates the pass band 102 of the filter 96. As may be appreciated, this pass band 102 is illustrated as a band-pass filter characteristic centered at $f_c$, which is representative of both a band-pass filter and the combined effect of heterodyne mixing and low-pass filtering. FIG. 9C illustrates the spectrum of the filtered signal 106 appearing at the output of the filter 96. As may be seen in FIG. 9C, the tone signal 86 has been emphasized in the filtered signal 106, while the remainder of the signal spectrum has been suppressed. FIGS. 10A-10C correspond with FIGS. 9A-9C, for the case of optical signals modulated on a dual optical carrier light, for example signals conforming to the International Telecommunications Union (ITU) standards for 100 GHz or higher rate optical signals.

The threshold comparator 98 operates to compare the filtered signal 106 to a predetermined threshold 108, and outputs the detection signal 75 in accordance with the comparison result. For example, when the filtered signal 106 is above the predetermined threshold, the comparator 98 may output a detection signal 75 having a first state indicating that a tone signal 86 has been detected. Conversely, when the filtered signal 106 is below the predetermined threshold 108, the comparator 98 may output a detection signal having a second state indicating that a tone signal 86 has not been detected. With this arrangement, the detection signal 75 will automatically switch between the first and second states based on the presence or absence of the tone signal(s) 86 in the received optical signal 34. Based on the state of the detection signal 75, the controller 12 may initiate any of a variety of operations.

Figure 11:
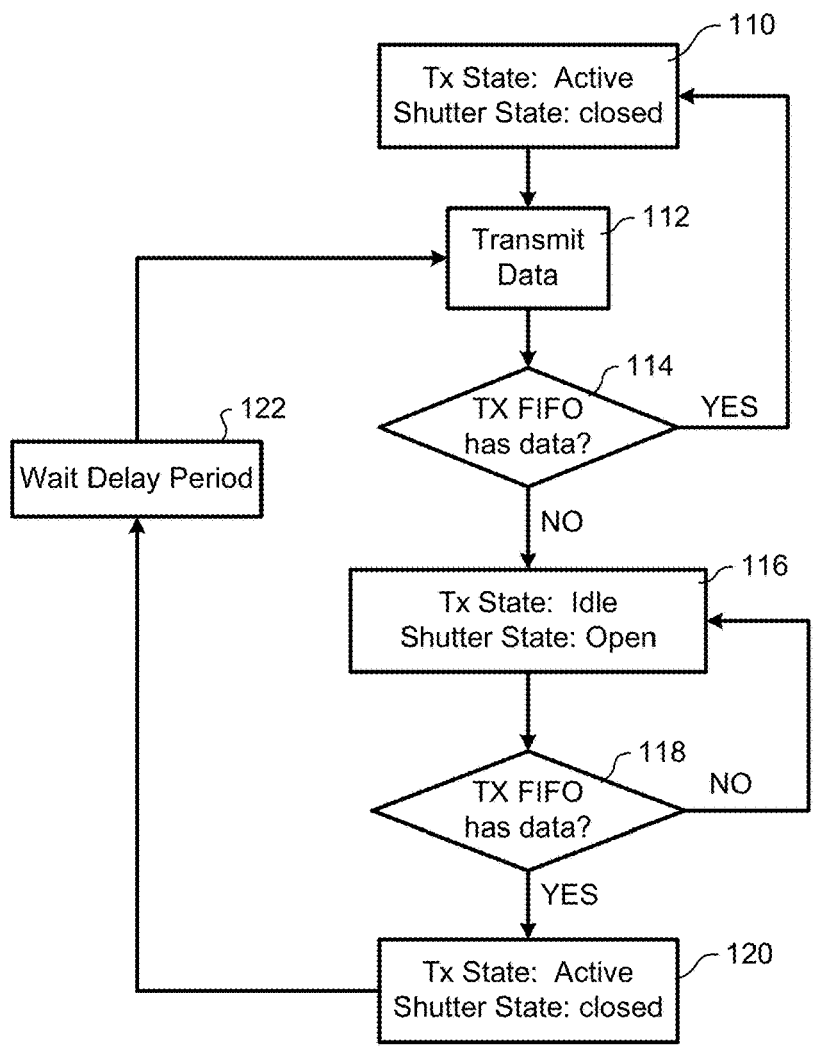
FIG. 11 is a flow-chart illustrating an example process for controlling a transmitter and tone generator in accordance with an embodiment of the present invention.
Figure 12:
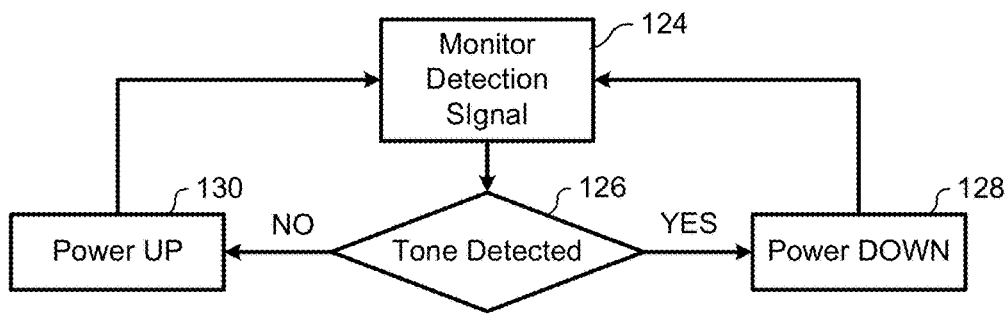
FIG. 12 is a flow-chart illustrating a representative process for controlling a receiver in accordance with an embodiment of the present invention.

For example, FIGS. 11 and 12 illustrate an embodiment in which all or part of the Rx DSP and FEC decoder are shut down when the counterpart transmitting transceiver is idle. As may be seen in FIG. 11, when the transmitting transceiver is in an active state (at 110), the shutter 80 is "closed" so that no tone signals 86 are transmitted. In this state, the transmitting transceiver can transmit data normally (as indicated at 112). If the Tx FIFO fill signal 68 changes state (at 114) to indicate that there is no subscriber data to send, the transmitting transceiver changes state to an idle state (at 116), and the shutter 80 is "opened" so tone signals 86 are transmitted. If the Tx FIFO fill signal 68 subsequently changes state again (at 118) to indicate that there is subscriber data to send, the transmitting transceiver changes state back to the active state (at 120), and the shutter 80 is "closed" to prevent tone signals 86 from being transmitted. The transmitting transceiver may then wait a predetermined wait period (at 122) before resuming data transmission (at 112). Referring to FIG. 12, the controller 12 of the receiving transceiver may monitor (at 124) the state of the detection signal 75. When the state of the detection signal 75 indicates that a tone signal 68 has been detected (at 126), the controller 12 of the receiving transceiver may recognise that the inbound optical signal is modulated with fill data only, and may therefore enter a Power-DOWN state (at 128) and shut down part or all of the Rx DSP and FEC decoder. On the other hand, when the state of the detection signal 75 indicates that a tone signal 68 has not been detected (at 126), the controller 12 of the receiving transceiver may recognise that the inbound optical signal is (or soon will be) modulated with subscriber data, and may therefore enter a Power-UP state (at 130) and bring (or maintain) the Rx DSP and FEC decoder to a fully operational condition, for example by reactivating any previously shut down portions of the Rx DSP and FEC decoder. As noted above with reference to FIG. 2, this operation can reduce power consumption of the transceiver by as much as 50%.

In some embodiments, both of the Rx DSP and FEC decoder may be completely shut down, which maximizes the reduction in power consumption. However, this is not essential. If desired, only one of Rx DSP and FEC decoder may be shut down. If desired, selected portions of the Rx DSP may be shut down, while other remain in operation. For example, portions of the Rx DSP associated with Chromatic Dispersion (CD) compensation; Symbol clock recovery; Polarization tracking and compensation; Carrier phase recovery and Symbol detection may be shut down, while portions related to Frequency Offset compensation may be maintained in operation.

In embodiments in which portions of the Rx DSP associated with Chromatic Dispersion (CD) compensation and Polarization tracking and compensation are shut down, the controller 12 may also store a copy of the most recently used compensation coefficients. These stored coefficients can then be reloaded into the Rx DSP as part of a re-activation process, to reduce the time needed for the Chromatic Dispersion (CD) compensation and Polarization tracking and compensation functions to re-acquire the inbound signal 34.

As may be appreciated, re-activation of the Rx DSP and FEC decoder requires reacquisition of signal by the Chromatic Dispersion (CD) compensation and Polarization tracking and compensation, carrier recovery and symbol timing functions. In some cases, the time required to accomplish this may be on the order of 100's of μs or more. However, this re-acquisition time may be reduced (e.g. by a factor of about 10) by reloading coefficients that were in use at the time that the Rx DSP was shut down. Reloading the CD compensation coefficients is particularly beneficial because in practical networks, the chromatic dispersion of the optical fiber link is constant or very slowly changing. As a result, reloading the previously used CD compensation coefficients very rapidly restores the CD compensation function to a near optimum state, which significantly accelerates symbol clock acquisition, Polarization tracking and compensation, and carrier recovery.

In some embodiments, the controller 12 of the sending transceiver controls its tone generator to stop inserting the optical tone signal 86 into the outbound optical signal a predetermined period of time before the transmitter 8 begins transmitting subscriber data. This predetermined period of time may correspond with a maximum anticipated time required for reactivation of the Rx DSP and FEC decoder in the receiving transceiver.

Alternatively, the controller 12 of the sending transceiver may control its tone generator to stop inserting the optical tone(s) into the outbound optical signal, and then wait for a "ready" signal from the receiving transceiver before enabling the transmitter 8 to begin transmitting subscriber data. In this case, the receiving transceiver may operate as described above to reactivate any portions of the Rx DSP and FEC decoder that have previously been shut down. Once the Rx DSP and FEC decoder are fully reactivated, the controller of the sending transceiver may send the "ready" signal to the sending transceiver to indicate that it is ready to receive subscriber data. This "ready" signal may be sent using the normal OAM signalling channel between the two transceivers.

As described above, the tone detector 74 is preferably configured as an analog device that operates to detect the presence (of absence) of a predetermined tone signal 86 embedded within a received optical signal 34. The tone detector 74 does not detect or recover any data that may be modulated on the received optical signal 34 (or the embedded tone signal 86). As such, it will be appreciated that the techniques described herein convey information by means of changes in the spectral envelope of the optical signal. This function distinguishes the present technique from conventional communications techniques in which information is conveyed by modulating a (usually narrow-band) carrier with data. It will be recognised that modulation of a carrier necessarily alters the spectral envelope of the carrier, and the changing spectral envelope is inherently indicative of the modulated data. However, it is in general not possible to recover any of the modulated data by detecting the presence or absence of one or more optical tones embedded within the spectral envelope, as is provided by the present technique.

In the embodiments described above, the tone generator 72 and tone detector 74 are respectively configured to send and detect a tone signal 86 comprising a single optical tone. This arrangement can be used to enable the sending transceiver to convey simple signalling information regarding the state of the sending transceiver (such as, for example, the idle or active state of the sending transceiver) to the receiving transceiver. As will be appreciated, the tone generator 72 and tone detector 74 may be configured to respectively send and detect tone signal 86 comprising two or more optical tones, which may be separated in any combination of frequency, polarization and time. Tone signal 86 comprising two or more optical tones enable the transmission of more complex signalling information regarding the operational state of the sending transceiver and/or the optical fiber link. For example, multi-tone signals may be used to convey information about a change in a security algorithm, or a modulation scheme. Other information may be conveyed, as will be apparent to those of ordinary skill.

Advantageously, the techniques described herein enables signalling information to be conveyed between the sending and receiving transceivers in a manner that is independent of the Rx DSP and FEC decoder in the receiving transceiver. This means, for example, that the sending and receiving transceivers can still coordinate their operation even when the Rx DSP and FEC decoder in the receiving transceiver are shut down (and thus the OAM channel is not operating).

As will be appreciated, the insertion of tone signals 86 in the optical signal 24 sent by the transmitter 8 will necessarily interfere with any data modulated on the optical signal 24, and this may produce a burst of errors in data recovered in the receiver 10. However, especially in embodiments in which the tone signal 86 is used to convey an idle status of the sending transceiver, such an error burst only affects the null data stream, and so is of no consequence. In embodiments in which the tone signal 86 is used to convey other information, various methods may be used to mitigate the effect of the tone signal 86. For example, in a scenario in which the capacity of the sending transmitter 8 is partially filled, the optical signal 24 transmitted by the sending transceiver will contain a mixture of subscriber and null data. In this scenario, the controller may operate to control the tone generator 72 to send tone signals 86 only during time slots that are being used to send null data.

In the embodiments described above, the tone generator is provided as an optical modulator configured to modulate light from the local oscillator 6 in accordance with a tone signal from an electrical oscillator. It will be appreciated that other techniques may equally be used without departing from the scope of the claims. For example, in some optical transceivers, the Tx ASIC may be provided as a complex signal synthesizer configured to drive the Tx optical modulator so as to produce an optical signal having a desired spectral envelope. In such cases, the Tx ASIC can be controlled to generate the desired tone signals, and thereby obviate the need for a separate tone generator 72. For example, in a case where the Tx ASIC includes a frequency-domain processor configured to process frequency components of the data signal, it is a relatively simple matter to impose a desired amplitude (or gain, if desired) to selected frequency components. The imposed amplitude (or gain) can be large enough to produce the desired tone signal(s) in the spectrum of the optical signal 24 output from the Tx optical modulator. Similarly, a Tx ASIC configured as a complex signal synthesizer, can be controlled to generate desired predetermined spectral changes in the form of a predetermined pattern of optical power variation as a function of any combination of frequency, time or polarization.

Similarly, in the embodiments described above, a tone detector is associated with the receiver to detect predetermined spectral changes in the received optical signal. Such a tone detector is appropriate in embodiments in which the predetermined spectral change(s) take the form of one or more optical tones embedded within the received optical signal. In embodiments in which the predetermined spectral changes take other forms (such as optical power variations as a function of frequency, time or polarization) it will be appropriate to use alternative detecting means. For example, in many cases, the Rx DSP 42 utilizes a frequency-domain engine (not shown) for processing received optical signals to compensate at least chromatic dispersion and polarization. In this case, at least a front end (e.g. ADCs 40 and Fourier Transform blocks) of the Rx DSP 42 may be used to analyse the received optical signal to enable detection of the predetermined spectral change. While this change does require that at least a portion of the Rx DSP 42 is kept active at all times, it is still possible to obtain power savings by shutting down the Rx FEC decoder 54 (and possibly portions of the Rx DSP 42 as well) when the sending transceiver is inactive.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium. The software product includes instructions that enable a computer device (personal computer, server, or network device) to execute the methods provided in the embodiments of the present invention. For example, such an execution may correspond to a simulation of the logical operations as described herein. The software product may additionally or alternatively include instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for conveying signaling information through an optical fiber link between a transmitter and a receiver of an optical communication system, the method comprising:

generating, by the transmitter, a predetermined spectral change in an optical signal, and transmitting the optical signal including the predetermined spectral change through an optical fiber link to the receiver, the predetermined spectral change being indicative of the signaling information; and detecting, by a detector associated with the receiver, the predetermined spectral change in the optical signal received through the optical fiber link, and generating a detection signal in accordance with the detection result, the detection signal being variable between a first state indicative that the predetermined spectral change has been detected, and a second state indicative that the predetermined spectral change has not been detected, the detecting is performed independently of demodulation of the optical signal by the receiver; and controlling, by a controller of the receiver, a power state of at least a portion of the receiver in accordance with the state of the detection signal.

2. The method of claim 1, wherein the signaling information is related to any one or more of a current degree of utilization of the optical fiber link and an operational state of the transmitter.

3. The method of claim 1, wherein generating the predetermined spectral change in the optical signal comprises: generating a tone signal; and inserting the tone signal into the optical fiber link.

4. The method of claim 1, wherein generating the predetermined spectral change in the optical signal comprises controlling a digital signal processor (DSP) of the transmitter to drive an optical modulator to generate any one or more of:
a tone signal comprising one or more optical tones; and
a predetermined variation in optical power of the optical signal with respect to any one or more of frequency, time and polarization.

5. The method of claim 3, wherein generating the tone signal comprises:
generating an oscillator signal having a predetermined frequency; and
modulating an optical carrier light using the oscillator signal.

6. The method of claim 3, wherein detecting the tone signal comprises:
tapping a photodetector signal generated by a photodetector of the receiver in response to the optical signal received through the optical fiber link;
mixing the tapped photodetector signal with an oscillator signal having a predetermined frequency to generate a combined signal;
filtering the combined signal using a filter characteristic having a pass band corresponding to the tone signal, to generate a filtered signal; and
comparing the filtered signal to a predetermined threshold, and generating the detection signal based on the comparison result.

7. A transmitter for an optical communication system, the transmitter comprising:
a generator configured to convey signaling information by selectively imposing a predetermined spectral change on an optical signal transmitted through an optical fiber link of the optical communication system; and
a controller configured to control the generator to selectively impose the predetermined spectral change on the optical signal, in accordance with a transmit buffer fill signal;
the transmit buffer fill signal being variable between a first state indicative that there is subscriber data to be transmitted, and a second state indicative that there is no subscriber data to be transmitted and wherein the controller is configured to respond to the first state by blocking the predetermined spectral change, and respond to the second state by imposing the predetermined spectral change on the optical signal.

8. The transmitter of claim 7, wherein the generator comprises a tone generator configured to generate one or more optical tones.

9. The transmitter of claim 8, wherein the tone generator comprises:
an oscillator configured to generate an oscillator signal having a predetermined frequency; and
a modulator configured to modulate an optical carrier light using the oscillator signal.

10. The transmitter of claim 9, wherein the tone generator further comprises a shutter configured to selectively admit and block the tone signal.

11. The transmitter of claim 10, wherein the shutter comprises any one of: a Variable Optical Attenuator; a wavelength selective switch; a wavelength blocker; and a waveband blocker.

12. The transmitter of claim 7, wherein the generator comprises a digital signal processor (DSP) configured to drive an optical modulator to generate either one or both of:
a tone signal comprising one or more optical tones; and
a predetermined variation in optical power of the optical signal with respect to any one or more of frequency, time and polarization.

13. The transmitter of claim 7, wherein the predetermined spectral change comprises a predetermined variation in optical power of the optical signal with respect to any one or more of frequency, time and polarization, and wherein the generator comprises a transmitter digital signal processor (TxDSP) configured to drive an optical modulator to generate the optical signal including the predetermined spectral change.

14. A receiver for receiving signaling information through an optical fiber link of an optical communication system, the receiver comprising:
a detector configured to detect a predetermined spectral change in an optical signal received through the optical fiber link, and further configured to generate a detection signal in accordance with the detection result, the detection signal being variable between a first state indicative that the predetermined spectral change has been detected, and a second state indicative that the predetermined spectral change has not been detected, the detector being independent of a receiver digital signal processor configured to demodulate data modulated on the optical signal; and
a controller configured to control a power state of at least a portion of the receiver in accordance with the state of the detection signal.

15. The receiver of claim 14, wherein the detector comprises:
a mixer configured to mix a photodetector signal with an oscillator signal having a predetermined frequency to generate a combined signal, the photodetector signal corresponding to an optical signal transmitted through the optical fiber link;
a filter configured to filter the combined signal using a filter characteristic having a pass band corresponding to a tone signal, to generate a filtered signal; and
a comparator configured to compare the filtered signal to a predetermined threshold, and to generate a detection signal based on the comparison result.

16. The receiver of claim 14, wherein the controller is configured to respond to the first state by maintaining a power down state of operation of the receiver, and to respond to the second state by maintaining a power up state of the receiver.

17. The receiver of claim 16, further comprising a digital signal processor and a Forward Error Correction decoder, wherein the controller is configured for maintaining a power down state of operation of the receiver by shutting down one or more circuits of the digital signal processor or Forward Error Correction decoder.

18. The receiver of claim 16, further comprising a digital signal processor and a Forward Error Correction decoder, wherein the receiver is configured for maintaining the power up state of the receiver by reactivating one or more circuits of the digital signal processor or the Forward Error Correction decoder.

19. A transceiver for an optical communication system, the transceiver comprising:

a generator configured to selectively impose a first predetermined spectral change on a first optical signal transmitted through an optical fiber link of the optical communication system, the first predetermined spectral change being imposed on the first optical signal only when there is no subscriber data to be transmitted via the first optical signal; and a detector configured to detect a second predetermined spectral change in a second optical signal received through the optical fiber link, and further configured to generate a detection signal in accordance with the detection result, the detection signal being variable between a first state indicative that the predetermined spectral change has been detected, and a second state indicative that the predetermined spectral change has not been detected, the detector being configured to operate independently from a receiver configured to receive data modulated on the second optical signal received through the optical fiber link; and a controller configured to control a power state of at least a portion of the receiver in accordance with the state of the detection signal.

\* \* \* \* \*